(12) United States Patent
Furuishi et al.

(10) Patent No.: US 9,976,534 B2
(45) Date of Patent: May 22, 2018

(54) CONTROL DEVICE AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Akio Furuishi, Gotemba (JP); Yusuke Suzuki, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/425,500

(22) Filed: Feb. 6, 2017

(65) Prior Publication Data

US 2017/0226981 A1 Aug. 10, 2017

(30) Foreign Application Priority Data

Feb. 8, 2016 (JP) .................................. 2016-022275

(51) Int. Cl.
*F02M 37/04* (2006.01)
*F02P 5/153* (2006.01)
(Continued)

(52) U.S. Cl.
CPC ............ *F02P 5/153* (2013.01); *F02D 35/023* (2013.01); *F02D 35/027* (2013.01); *F02D 35/028* (2013.01); *F02D 41/263* (2013.01); *F02P 5/045* (2013.01); *F02P 5/152* (2013.01); *F02D 41/1498* (2013.01); *Y02T 10/46* (2013.01)

(58) Field of Classification Search
CPC ...... F02P 5/00; F02P 5/04; F02P 5/045; F02P 5/15; F02P 5/1522; F02P 5/16; F02P 17/12; F02P 2017/125; F02D 35/023; F02D 35/024; F02D 2001/0085; F02D 41/401
USPC ........ 701/101, 104, 105, 114, 115; 123/434, 123/435, 478, 480, 594, 609, 406.47
See application file for complete search history.

(56) References Cited

U.S. PATENT DOCUMENTS 6,041,755 A 3/2000 Mashiki
2015/0377166 A1* 12/2015 Yasuda ............... F02D 41/0002
123/406.41
(Continued)

FOREIGN PATENT DOCUMENTS

| JP | H10-176570 A | 6/1998 |
|----|--------------|--------|
| JP | 2006-009720 A | 1/2006 |
| JP | 2015-081594 A | 4/2015 |

*Primary Examiner* — John Kwon
(74) *Attorney, Agent, or Firm* — Hunton Andrews Kurth LLP

(57) ABSTRACT

A control device includes an electronic control unit. The electronic control unit is configured to calculate an ignitionability index value and a combustion timing index value. The electronic control unit is configured to store relevant information defining a relationship between the ignitionability index value and the combustion timing index value, and a torque fluctuation limit value. The electronic control unit is configured to calculate a distance between a current operating point, which is specified by the ignitionability index value and the combustion timing index value, and a point on the torque fluctuation limit line. The electronic control unit is configured to retard ignition timing when the distance is larger than a threshold value, and enrich an air-fuel ratio and retard the ignition timing when the distance is equal to or smaller than the threshold value.

7 Claims, 7 Drawing Sheets

(51) Int. Cl.
*F02D 35/02* (2006.01)
*F02D 41/26* (2006.01)
*F02P 5/152* (2006.01)
*F02P 5/04* (2006.01)
*F02D 41/14* (2006.01)

(56) References Cited

U.S. PATENT DOCUMENTS

2017/0009672 A1* 1/2017 Sasaki ................... F02D 41/26
2017/0022911 A1* 1/2017 Kitagawa ............... F02D 35/023
2017/0030283 A1* 2/2017 Sasaki ................... F02D 35/028

* cited by examiner

CONTROL DEVICE AND CONTROL METHOD FOR INTERNAL COMBUSTION ENGINE

INCORPORATION BY REFERENCE

The disclosure of Japanese Patent Application No. 2016-022275 filed on Feb. 8, 2016 including the specification, drawings and abstract is incorporated herein by reference in its entirety.

BACKGROUND

1. Technical Field

The present disclosure relates to a control device and a control method for an internal combustion engine.

2. Description of the Related Art

A control device for an internal combustion engine that performs a lean burn operation with a larger lean air-fuel ratio than a stoichiometric air-fuel ratio is disclosed in Japanese Patent Application Publication No. 10-176570 (JP 10-176570 A). In this control device, the retardation amount of ignition timing is calculated on the basis of a result of detecting knocking by a knocking sensor, and a torque fluctuation value is calculated using an output value of a crank angle sensor. Then, in a case where the calculated torque fluctuation value exceeds a target value, an increase in the amount of injected fuel is executed for enrichment of the air-fuel ratio. Additionally, in a case where the retardation amount of the ignition timing exceeds a predetermined amount, the execution of the increase in the amount of injected fuel is limited.

The control device for the internal combustion engine may perform retardation of the ignition timing for purposes, such as knocking suppression, according to a retardation request for the ignition timing. Torque fluctuation becomes large if the ignition timing is retarded. According to JP 10-176570 A, in order to perform the enrichment of the air-fuel ratio for suppressing the torque fluctuation, it is required to actually calculate the torque fluctuation value.

SUMMARY

Elapse of a plurality of predetermined cycles are required for the calculation of the torque fluctuation value. For this reason, an actual torque fluctuation value may exceed a torque fluctuation limit value when the calculation of the torque fluctuation value is completed.

Meanwhile, storing relevant information (for example, a map) that determines a relationship between the ignition timing and the air-fuel ratio, and the torque fluctuation limit value in advance, and retardation of the ignition timing being performed using the relevant information without calculating the torque fluctuation value on an actual machine may be considered. However, the value of the ignition timing when reaching the torque fluctuation limit value may vary according to changes in environmental conditions relating to combustion. Here, intake air temperature, engine cooling water temperature, engine lubrication oil temperature, and the octane number of fuel are assumed as the environmental conditions.

As described above, the value of the ignition timing when reaching the torque fluctuation limit value varies according to changes in the above environmental conditions. Hence, in order not to exceed the torque fluctuation limit value when the retardation of the ignition timing is performed, it is necessary to specify the torque fluctuation limit value in an aspect in which an allowance for which changes in the environmental conditions is taken into consideration is estimated. In a case where the above allowance is estimated and the torque fluctuation limit value is specified, even in a situation where there is practically an allowance for the torque fluctuation limit value under actual environmental conditions when the retardation of the ignition timing is performed, the enrichment of the air-fuel ratio is performed for suppressing an increase in the torque fluctuation. As a result, fuel efficiency may degrade. For this reason, it can be said that it is desirable that an allowance to be estimated in the case of the specification of the torque fluctuation limit value should be sufficiently small. For that purpose, it is desirable that engine parameters used to define the relevant information with the torque fluctuation limit value are those which allow the torque fluctuation limit value to be specified with hardly any influence due to changes in the above environmental conditions, instead of the above-described ignition timing and air-fuel ratio.

This disclosure provides a control device and a control method for an internal combustion engine that includes relevant information in which a relationship between engine parameters that are not easily influenced by changes in the above-described environmental conditions, and a torque fluctuation limit value, is defined, and are adapted to perform retardation of ignition timing while preventing the torque fluctuation limit value from being exceeded, utilizing such relevant information, without a torque fluctuation value on the actual machine being calculated.

A first aspect of the present disclosure provides a control device for an internal combustion engine. The internal combustion engine includes an ignition device, a fuel injection valve, and an in-cylinder pressure sensor. The ignition device is configured to ignite an air-fuel mixture within a cylinder of the internal combustion engine. The fuel injection valve is configured to supply fuel into the cylinder. The in-cylinder pressure sensor is configured to detect in-cylinder pressure. The control device includes an electronic control unit. The electronic control unit is configured to: calculate an ignitionability index value and a combustion timing index value, based on an output value of the in-cylinder pressure sensor. The electronic control unit is configured to store relevant information that defines a relationship between the ignitionability index value and the combustion timing index value, and a torque fluctuation limit value, and store a torque fluctuation limit line based on the relevant information. The electronic control unit is configured to calculate a distance between a current operating point of the internal combustion engine and a point on the torque fluctuation limit line, on an xy plane having the ignitionability index value as an x-coordinate value and having the combustion timing index value as a y-coordinate value. The current operating point is specified by the ignitionability index value and the combustion timing index value. The electronic control unit is configured to execute a first control in which the ignition device is controlled such that ignition timing is retarded, when the distance is larger than a threshold value. The electronic control unit is configured to execute a second control in which the fuel injection valve is controlled such that an air-fuel ratio is enriched and the ignition device is controlled such that the ignition timing is retarded, when the distance is equal to or smaller than the threshold value.

In the control device, the internal combustion engine may further includes a knocking detector that detects knocking. The electronic control unit may be configured to retard the ignition timing when the distance is larger than the threshold value in a case where knocking is suppressed based on a detection result of the knocking detector, in the first control. The electronic control unit may be configured to retard the ignition timing and enrich the air-fuel ratio when the distance is equal to or smaller than the threshold value in a case where knocking is suppressed based on the detection result of the knocking detector, in the second control.

In the control device, the electronic control unit may be configured to determine, in the second control, a value of an increase in an amount of injected fuel for enrichment of the air-fuel ratio and a retardation amount of the ignition timing such that, on the xy plane, the operating point does not exceed an equal knocking level line corresponding to a current knocking level and does not exceed the torque fluctuation limit line. The equal knocking level line in which a knocking level is constant may be defined based on at least one of knocking intensity and knocking frequency.

In the control device, the internal combustion engine may be an internal combustion engine in which a lean burn operation is performed in a lean air-fuel ratio larger than a stoichiometric air-fuel ratio. The threshold value when the lean air-fuel ratio is large may be larger than the threshold value when the lean air-fuel ratio is small.

In the control device, the electronic control unit may be configured to calculate a shortest distance between the current operating point and the torque fluctuation limit line as the distance.

In the control device, the electronic control unit may be configured to calculate a distance between the current operating point and an intersection point between an equal air-fuel ratio line passing through the current operating point and the torque fluctuation limit line as the distance.

A second aspect of the present disclosure provides a control method for an internal combustion engine. The internal combustion engine includes an ignition device, a fuel injection valve, and an in-cylinder pressure sensor. The ignition device is configured to ignite an air-fuel mixture within a cylinder of the internal combustion engine. The fuel injection valve is configured to supply fuel into the cylinder. The in-cylinder pressure sensor is configured to detect in-cylinder pressure. The control method includes: calculating an ignitionability index value and a combustion timing index value, based on an output value of the in-cylinder pressure sensor; storing relevant information that defines a relationship between the ignitionability index value and the combustion timing index value, and a torque fluctuation limit value; storing a torque fluctuation limit line based on the relevant information; calculating a distance between a current operating point of the internal combustion engine and a point on the torque fluctuation limit line, on an xy plane having the ignitionability index value as an x-coordinate value and having the combustion timing index value as a y-coordinate value, the current operating point being specified by the ignitionability index value and the combustion timing index value; executing a first control in which the ignition device is controlled such that ignition timing is retarded, when the distance is larger than a threshold value; and executing a second control in which the fuel injection valve is controlled such that an air-fuel ratio is enriched and the ignition device is controlled such that the ignition timing is retarded, when the distance is equal to or smaller than the threshold value.

According to the above configuration, the relevant information that defines the relationship between the ignitionability index value and the combustion timing index value, and the torque fluctuation limit value is used when the retardation of the ignition timing is performed. According to this relevant information, the torque fluctuation limit value with respect to the ignitionability index value and the combustion timing index value can be specified, making it hard to be influenced by changes in environmental conditions (at least intake air temperature, engine cooling water temperature, engine lubrication oil temperature, and the octane number of fuel) relating to combustion. For this reason, the torque fluctuation limit line can be ascertained on the xy plane having the index value as the x-coordinate value and having the combustion timing index value as the y-coordinate value without the necessity for estimating allowances for which changes in the above-described environmental conditions are taking into consideration (while sufficiently lessening at least such allowances). According to the above configuration, in a case where the distance between the current operating point on the above xy plane and the point on the torque fluctuation limit line is larger than the threshold value, the ignition timing is retarded. Meanwhile, in a case where the distance is equal to or smaller than the threshold value, the enrichment of the air-fuel ratio and the retardation of the ignition timing are executed, and thereby, the retardation of the ignition timing is executed while suppressing an increase in the torque fluctuation. According, the retardation of the ignition timing can be performed while appropriately ascertaining a positional relationship between the current operating point and the torque fluctuation limit line, due to utilization of the above relevant information. Thus, the retardation of the ignition timing can be performed while preventing the torque fluctuation limit value from being exceeded without calculating the torque fluctuation value on the actual machine.

BRIEF DESCRIPTION OF THE DRAWINGS

Features and advantages, and technical and industrial significance of exemplary embodiments will be described below with reference to the accompanying drawings, in which like numerals denote like elements, and wherein.

DETAILED DESCRIPTION OF EMBODIMENTS

Embodiment 1 of the disclosure will be described with reference to FIGS. 1 to 11.

Figure 1:
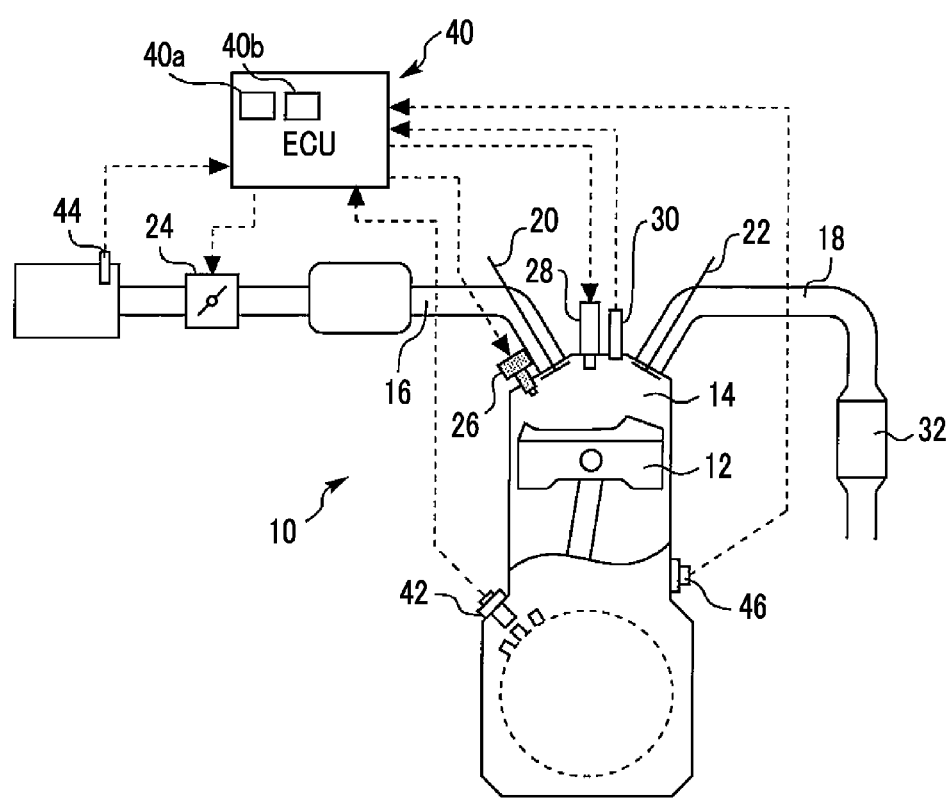
FIG. 1 is a view for describing a system configuration of Embodiment 1.

FIG. 1 is a view for describing a system configuration of Embodiment 1. A system illustrated in FIG. 1 includes a spark-ignited internal combustion engine (gasoline engine as an example) 10. A piston 12 is provided within a cylinder of the internal combustion engine 10. A combustion chamber 14 is formed on a top part side of the piston 12 within the cylinder. An intake passage 16 and an exhaust passage 18 communicate with the combustion chamber 14.

An intake port of the intake passage 16 is provided with an intake valve 20 that opens and closes the intake port. An exhaust port of the exhaust passage 18 is provided with an exhaust valve 22 that opens and closes the exhaust port. The intake passage 16 is provided with an electronically controlled throttle valve 24. Each cylinder of the internal combustion engine 10 is provided in with a fuel injection valve 26 for directly injecting fuel into the combustion chamber 14 (into the cylinder), and an ignition device (only an ignition plug is illustrated) 28 for igniting an air-fuel mixture. Moreover, an in-cylinder pressure sensor 30 for detecting in-cylinder pressure is built into each cylinder. Additionally, an exhaust cleaning catalyst 32 for cleaning exhaust gas is installed in the exhaust passage 18. The fuel injection valve that supplies fuel into the cylinder of the internal combustion engine 10 may be a port injection type fuel injection valve that injects fuel into an intake port instead of or together with the cylinder injection type fuel injection valve 26.

The system of the present embodiment includes a drive circuit (not illustrated) for driving the following various actuators or the like together with an electronic control unit (ECU) 40 as a control device that controls the internal combustion engine 10. The ECU 40 includes an input/output interface, a memory 40a, and a central processing unit (CPU) 40b. The input/output interface is provided to fetch sensor signals from various sensors attached to the internal combustion engine 10 or a vehicle on which this internal combustion engine is mounted and to output operation signals to the various actuators provided in the internal combustion engine 10. Various control programs, maps, or the like for controlling the internal combustion engine 10 are stored in the memory 40a. The CPU 40b executes various kinds of calculation processing on the basis of the control programs stored in the memory 40a, and generates operation signals for the various actuators on the basis of the fetched sensor signals.

Various sensors for acquiring the engine operational state, such as a crank angle sensor 42 arranged in the vicinity of a crankshaft (not illustrated), an air flow sensor 44 arranged near an inlet of the intake passage 16, a knocking sensor 46 (an example of a knocking detector) for detecting knocking, and the like, in addition to the above-described in-cylinder pressure sensor 30, are included in the sensors from which the ECU 40 fetches the signals. As the knocking sensor 46, a sensor of a type in which the vibration of the internal combustion engine 10 transmitted to a cylinder block is detected by a piezoelectric element can be used as an example.

Various actuators for controlling engine operation, such as the above-described throttle valve 24, fuel injection valve 26, and ignition device 28, are included in the actuators to which the ECU 40 outputs the operation signals. Additionally, the ECU 40 has a function of synchronizing an output signal of the in-cylinder pressure sensor 30 with a crank angle, performing AD conversion of the synchronized signal, and acquiring the AD converted signal. Accordingly, the in-cylinder pressure in arbitrary crank angle timing can be detected in a range where the resolving power of the AD conversion is allowed. Moreover, the ECU 40 stores maps that determine a relationship between crank angles and in-cylinder volume, and can calculate the in-cylinder volume corresponding to the crank angles with reference to such a map.

Figure 2:
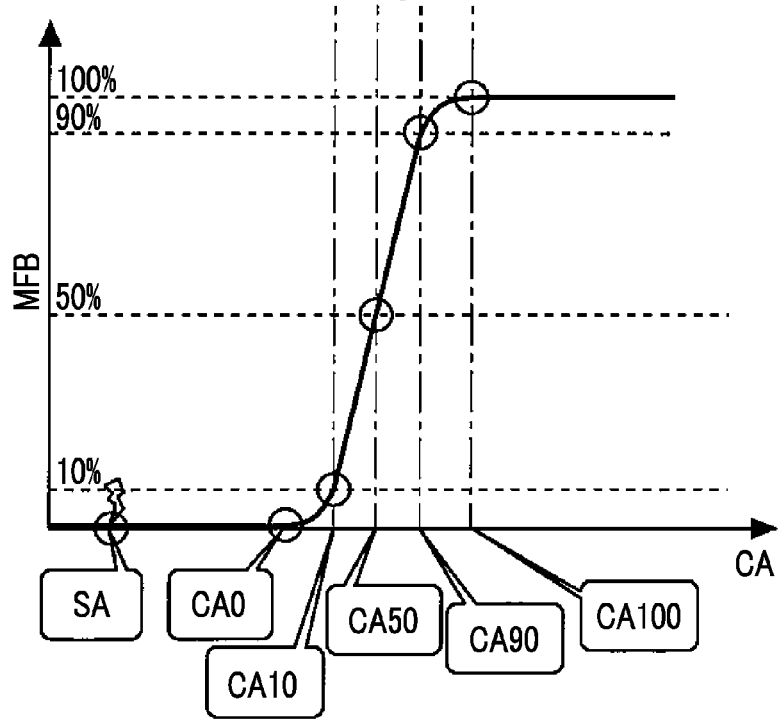
FIG. 2 is a view illustrating the waveforms of ignition timing and combustion mass rates.

Next, calculation of actually measured data of MFB utilizing the in-cylinder pressure sensor will be described. FIG. 2 is a view illustrating the ignition timing and the waveforms of the combustion mass rates. According to the system of the present embodiment including the in-cylinder pressure sensor 30 and the crank angle sensor 42, in each cycle of the internal combustion engine 10, actually measured data of in-cylinder pressure P synchronous with crank angles can be acquired. The actually measured data of the in-cylinder pressure P specifically is set data of the in-cylinder pressure P calculated as values for individual predetermined crank angles. Heat generation amount Q within the cylinder in arbitrary crank angles θ can be calculated according to the Formulas (1) and (2), using the obtained actually measured data of the in-cylinder pressure P and the first law of thermodynamics. Then, combustion mass rates (hereinafter referred to as "MFB") in the arbitrary crank angles θ can be calculated according to the following Formula (3), using the calculated actually measured data (the set of the heat generation amount Q calculated as values for individual predetermined crank angles) of the heat generation amount Q. In addition, the actually measured data (the set of the actually measured MFB) of MFB synchronous with crank angles can be calculated by executing calculation processing of MFB for individual predetermined crank angles. The actually measured data of MFB is calculated in a combustion period and a predetermined crank angle period (here, as an example, a crank angle period from closing timing IVC of the intake valve 20 to opening timing EVO of the exhaust valve 22) before and after the combustion period.

$$dQ/d\theta = \frac{1}{\kappa - 1} \times \left( V \times \frac{dP}{d\theta} + P \times \kappa \times \frac{dV}{d\theta} \right) \quad (1)$$

$$Q = \sum \frac{dQ}{d\theta} \quad (2)$$

$$MFB = \frac{Q(\theta) - Q(\theta_{min})}{Q(\theta_{max}) - Q(\theta_{min})} \times 100 \quad (3)$$

In the above Formula (1), V is the in-cylinder volume and κ is the specific heat ratio of in-cylinder gas. Additionally, in the above Formula (3), $\theta_{min}$ is a combustion starting point, and $\theta_{max}$ is a combustion termination point.

According to the actually measured data of MFB calculated by the above technique, a crank angle (hereinafter, referred to as "a specific rate combustion point", and designated as "CAα") when MFB reaches a specific rate α % can be calculated. Next, typical specific rate combustion point CAα will be described with reference to FIG. 2. In-cylinder combustion is started with ignition delay after lighting an air-fuel mixture at ignition timing SA. A starting point ($\theta_{min}$ in the above Formula (3)) of this combustion, that is, a crank angle when MFB rises is referred to as CA0. A crank angle period (CA0 to CA10) from CA0 to a crank angle CA10 when MFB reaches 10% is equivalent to an initial combustion period. A crank angle period (CA10 to CA90) from CA10 to a crank angle CA90 when MFB reaches 90% is equivalent to a main combustion period. Additionally, in the present embodiment, a crank angle CA50 when MFB reaches 50% is used as a combustion center of gravity. A crank angle CA100 when MFB reaches 100% is equivalent to a combustion termination point ($\theta_{max}$ in the above Formula (3)) where the heat generation amount Q reaches a maximum value. The combustion periods are defined as crank angle periods from CA0 to CA100.

Basic ignition timing is set in advance as a value according to the operation conditions (mainly an engine load or engine torque, an engine rotation speed, and an air-fuel ratio) of the internal combustion engine 10, and is stored in the memory 40a. The engine torque can be calculated, for example, utilizing the actually measured data of the in-cylinder pressure P acquired using the in-cylinder pressure sensor 30.

Figure 3:
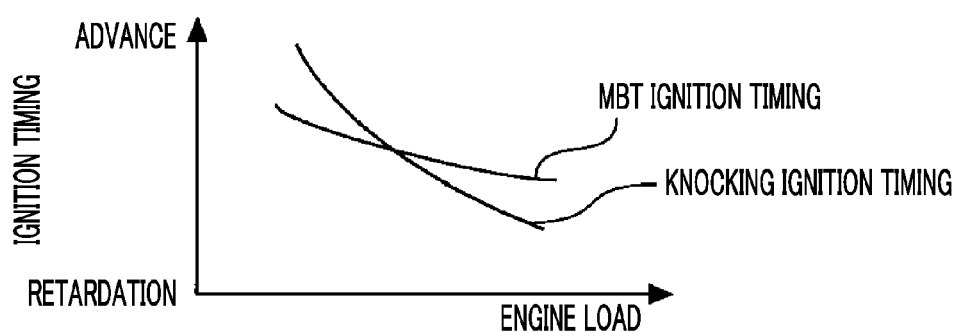
FIG. 3 is a view for describing setting of basic ignition timing.

FIG. 3 is a view for describing setting of the basic ignition timing, and illustrates a relationship between the basic ignition timing and the engine load at a predetermined engine rotation speed as an example. Two ignition timings, that is, a Minimum Advance for Best Torque (MBT) ignition timing and a knocking ignition timing, that serve as candidates for the basic ignition timing are illustrated in FIG. 3.

The knocking ignition timing herein is an ignition timing when a predetermined target knocking level is obtained. The knocking level is an index based on knocking intensity and knocking frequency. More specifically, the index based on the knocking intensity and the knocking frequency is an index made to be higher as the knocking intensity is larger and to be higher as the knocking frequency is higher. The knocking intensity can be calculated as a value according to the intensity of vibration calculated on the basis of an output signal of the knocking sensor 46, as an example. The knocking frequency is a frequency at which knocking of the focused knocking intensity occurs during a plurality of predetermined cycles. Hence, the knocking level becomes higher as the knocking intensity of knocking occurring in the plurality of predetermined cycles is higher and as the knocking frequency in the plurality of cycles is higher.

Since the in-cylinder pressure and in-cylinder temperature at the time of combustion become higher as the engine load is higher, knocking is apt to occur. For this reason, the MBT ignition timing shifts to a retarded side as the engine load is higher. Additionally, as the engine load is higher, knocking with large knocking intensity is apt to occur, and the knocking frequency is also apt to become higher. For this reason, the knocking ignition timing (that is, the ignition timing when the target knocking level is obtained as described above) shifts to the retarded side as the engine load is higher. As illustrated in FIG. 3, the MBT ignition timing has a value on the retarded side on a low load side, and the knocking ignition timing has a value on the retarded side on a high load side. As the basic ignition timing in each engine load, a value on the retarded side is selected out of the MBT ignition timing and the knocking ignition timing.

Control of the ignition timing in the internal combustion engine 10 is executed using an ignition timing obtained by adding an ignition timing retardation amount (the amount of correction) to the above-described basic ignition timing as a target ignition timing. A retardation request assumed in the present embodiment is a retardation request intended to suppress knocking (specifically, reduce the knocking level).

Knocking control is executed in the present embodiment. The knocking control means controlling the ignition timing so as to bring the knocking level close to the target knocking level. The retardation request intended to reduce the knocking level is a requirement that may be issued during execution of the knocking control. The basic ignition timing is stored in the memory 40a as a value at which the environmental conditions related to combustion are under standard conditions. The above standard conditions are, more specifically, conditions under which intake air temperature, engine cooling water temperature, engine lubrication oil temperature, and the octane number of fuel are made to have standard values. As long as the internal combustion engine 10 is operated in a state closer to these standard conditions, the target knocking level can be realized by the target ignition timing equivalent to the basic ignition timing. Meanwhile, for example, in a case where the intake air temperature becomes higher than a standard value by the internal combustion engine 10 being operated in a high outside-air-temperature area or in a case where fuel with an octane number lower than the standard value is used, the knocking level may become higher compared with the target knocking level in a case where the basic ignition timing is used as it is. As a result, retardation of the ignition timing is required in order to lower the knocking level to the target knocking level.

Here, an example of the knocking control will be specifically described. The ignition timing retardation amount utilized for this knocking control is learned by the following processing and is stored in the memory 40a. This ignition timing retardation amount is increased or decreased according to the knocking level. The knocking level is the knocking intensity and the knocking frequency that are calculated on the basis of a detection result of knocking by the knocking sensor 46. The increase or decrease in the ignition timing retardation amount according to the knocking level more specifically means that the ignition timing retardation amount is greatly corrected by a predetermined amount R1 and is stored in the memory 40a in a case where the knocking level is higher than the target knocking level. In addition, the case where the knocking level is higher than the target knocking level is, specifically, a case where the knocking intensity is larger than the knocking intensity of the target knocking level or a case where the knocking frequency is higher than the knocking frequency of a target level. As a result, the target ignition timing of the cylinder where combustion is performed after main determination is retarded with respect to a current value. If the ignition timing is retarded, a maximum value Pmax of in-cylinder pressure can be suppressed to be low by lowering the combustion speed of the air-fuel mixture, and accordingly, the knocking intensity and the knocking frequency can be lowered. As a result, the knocking level can be reduced. Meanwhile, in a case where the period for which the knocking level is determined to be equal to or smaller than the target knocking level meanwhile continues for a predetermined period, an advance command of the ignition timing is issued, and the ignition timing retardation amount is corrected on a small scale by a predetermined amount and is stored in the memory 40a. As a result, the target ignition timing of the cylinder where combustion is performed after the main determination is advanced with respect to the current value. In addition, the ignition timing retardation amount is zero. Hence, a limiting value of the target ignition timing on an advanced side becomes the basic ignition timing.

According to the knocking control described above, even in a case where the above-described environmental conditions have varied to a severe side in the viewpoint of knocking with respect to the standard conditions, the target knocking level can be maintained.

Figure 4:
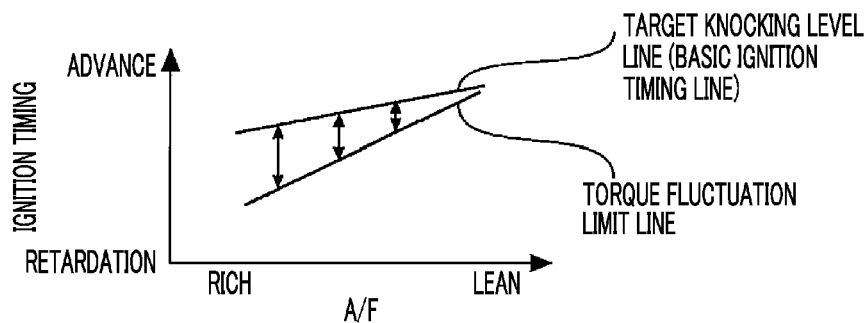
FIG. 4 is a view illustrating a relationship between the basic ignition timing and a torque fluctuation limit value in a lean air-fuel ratio region closer to a lean side than the stoichiometric air-fuel ratio.

Next, a relationship between the basic ignition timing and torque fluctuation limit at the time of a lean burn operation will be described. As a premise, in the present embodiment, the lean burn operation is performed with a larger lean air-fuel ratio than a stoichiometric air-fuel ratio. FIG. 4 is a view illustrating a relationship between the basic ignition timing and a torque fluctuation limit value in a lean air-fuel ratio region closer to a lean side than the stoichiometric air-fuel ratio. In addition, FIG. 4 illustrates the relationship in the same engine load and the same engine rotation speed within a high load region where the knocking ignition timing is selected as the basic ignition timing as an example. In addition, a line of the basic ignition timing (an ignition timing line) illustrated in FIG. 4 is equivalent to an equal knocking level line on which the knocking level is equal to the target knocking level. In each of the equal knocking level line, a knock level is constant. The value of the ignition timing when reaching the torque fluctuation limit value shifts to the advanced side as the air-fuel ratio becomes leaner.

In a case where the ignition timing is retarded during the lean burn operation, torque fluctuation is apt to become larger compared to a case where the ignition timing is retarded during a stoichiometric air-fuel ratio combustion operation. For this reason, at the time of the lean burn operation, the width of the ignition timing from the basic ignition timing to torque fluctuation limit lines becomes shorter (that is, an allowance for retardation becomes lower) compared to at the time of the stoichiometric air-fuel ratio combustion operation. More specifically, the allowance in the lean air-fuel ratio region becomes lower as the air-fuel ratio becomes leaner as indicated by an arrow in FIG. 4.

Next, a case where the retardation of the ignition timing is performed using a relationship in which the torque fluctuation limit value is defined utilizing the ignition timing and the air-fuel ratio so as not to exceed the torque fluctuation limit lines will be described with reference to FIGS. 5A and 5B. The ignition timing and the air-fuel ratio that are exemplified herein are different from engine parameters (to be described below) to be utilized in the present embodiment.

Figures 5A, 5B:
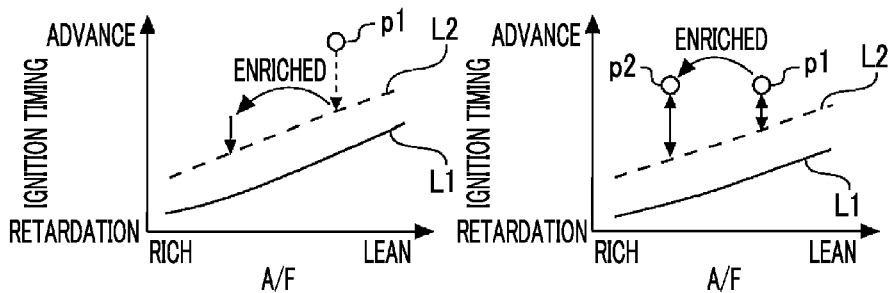
FIG. 5A is an explanatory view when performing the retardation of the ignition timing utilizing a relationship in which the torque fluctuation limit value is defined using the ignition timing and the air-fuel ratio so as not to exceed torque fluctuation limit lines.
FIG. 5B is an explanatory view when performing the retardation of the ignition timing using the relationship in which the torque fluctuation limit value is defined utilizing the ignition timing and the air-fuel ratio so as not to exceed the torque fluctuation limit lines.

A torque fluctuation limit line L1 illustrated in FIGS. 5A and 5B is defined as values in the above-described standard environmental conditions (conditions under which the intake air temperature and the like have standard values). Meanwhile, a torque fluctuation limit line L2 is defined in consideration of changes in the environmental conditions. More specifically, the torque fluctuation limit line L2 is defined with allowances for preventing operating point p from exceeding the original torque fluctuation limit line L1 even in a case where changes in the environmental conditions have occurred.

When a retardation request for the ignition timing is issued for reducing the knocking level in a case where the allowances for changes in the above environmental conditions are estimated, as illustrated in FIGS. 5A and 5B, the ignition timing is not retarded only from a current operating point p1 (an operating point that is suited in advance) to the torque fluctuation limit line L2. Meanwhile, since combustion stability can be improved if the air-fuel ratio is enriched in the lean air-fuel ratio region, the value of the ignition timing when reaching the torque fluctuation limit value shifts to the retarded side. For this reason, in a case where the retardation amount required for reducing the knocking level cannot be secured, as illustrated in FIG. 5A, it is necessary to continue the retardation in the required predetermined amount (retardation amount) R1, enriching the air-fuel ratio due to an increase in the amount of injected fuel. Additionally, like an operating point p2 exemplified in FIG. 5B, a countermeasure in which an operating point where the allowance for retardation is sufficiently secured is used as the basic ignition timing (initial value) is also considered.

In a configuration in which the allowance for retardation is determined utilizing the above relationship between the ignition timing and the air-fuel ratio, and the torque fluctuation limit value, the air-fuel ratio may be enriched even in a case where there are practically an allowance for the torque fluctuation limit value when executing the retardation of the ignition timing. Accordingly, the frequency of execution of the lean burn operation in a state where the air-fuel ratio is sufficiently enleaned decreases. Additionally, if the countermeasure illustrated in FIG. 5B is performed, it becomes difficult to sufficiently enlean the air-fuel ratio itself. For this reason, even in any of these cases, a fuel efficiency reduction effect caused by the execution of the lean burn operation decreases. Additionally, if the air-fuel ratio approaches the stoichiometric air-fuel ratio in the lean air-fuel ratio region, there is a concern about an increase in the discharge amount of NOx.

Next, the engine parameters to be utilized in Embodiment 1 for the definition of relation with the torque fluctuation limit value will be described. In a case where the retardation of the ignition timing is performed for reducing the knocking level at the time of the lean burn operation, enrichment of the air-fuel ratio caused by the increase in the amount of injected fuel is not executed as much as possible, and the lean air-fuel ratio is used as much as possible. For that purpose, it is desirable that an allowance to estimate in specifying a torque fluctuation limit line is made sufficiently small, and accordingly, a possible retardation amount of the ignition timing can be sufficiently secured. For that purpose, it is desirable that the engine parameters used to define relevant information with the torque fluctuation limit value are those which can specify the torque fluctuation limit value with hardly any influence due to changes in the above environmental conditions, instead of the above-described ignition timing and air-fuel ratio.

The present application inventors has defined a relationship with the torque fluctuation limit value, utilizing a pair of an ignitionability index value and a combustion timing index value as the engine parameters, through keen research, and thereby has found out that it becomes unnecessary to provide allowances for specifying the torque fluctuation limit lines in the viewpoint of changes in the above-described environmental conditions. The details thereof will be described below with reference to FIGS. 6 and 7.

An example of the ignitionability index value to be used in the present embodiment is a crank angle period (more specifically, a difference obtained by subtracting the ignition timing (SA) from CA10) from the ignition timing to CA10, and is hereinafter referred to as "SA-CA10". Additionally, an example of the combustion timing index value is CA50 (combustion center of gravity). The ignition timing (SA) used for calculation of SA-CA10 is the above-described target ignition timing. CA10 and CA50 can be calculated utilizing the in-cylinder pressure sensor 30, as already described with reference to FIG. 2.

Figure 6:
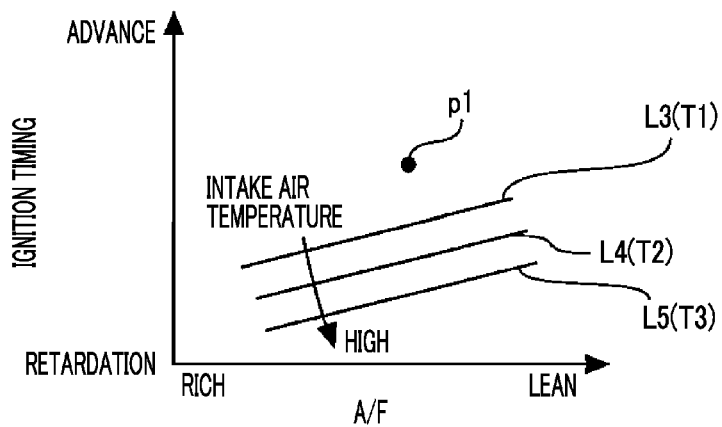
FIG. 6 is a view illustrating changes in the torque fluctuation limit lines resulting from changes in environmental conditions relating to combustion with the relationship between the ignition timing and the air-fuel ratio.

FIG. 6 is a view illustrating changes in the torque fluctuation limit lines resulting from changes in environmental conditions relating to combustion with the relationship between the ignition timing and the air-fuel ratio. Changes in the torque fluctuation limit lines resulting from changes in an intake air temperature condition that is one of the above-described environmental conditions are illustrated in an example illustrated in FIG. 6. The torque fluctuation limit lines L3 to L5 represent lines in a case where the intake air temperature is T1 to T3, respectively. Here, the intake air temperature T1 is a minimum value of the intake air temperature assumed during the operation of the internal combustion engine 10, the intake air temperature T2 is standard intake air temperature used to specify a map in a configuration (different from the configuration of the present embodiment) including the relationship illustrated in FIG. 6 as the map, and is used for the retardation of the ignition timing, and the intake air temperature T3 is a maximum value of the intake air temperature assumed during the operation.

As illustrated in FIG. 6, in a case where the torque fluctuation limit lines are arranged in the relationship between the ignition timing and the air-fuel ratio, it can be seen that the torque fluctuation limit lines vary according to the intake air temperature. More specifically, since the in-cylinder gas temperature of a compression end becomes higher as the intake air temperature is higher, combustion is easily stabilized (that is, the torque fluctuation becomes small). For this reason, the torque fluctuation limit lines shift to the retarded side as the intake air temperature is higher.

Figure 7:
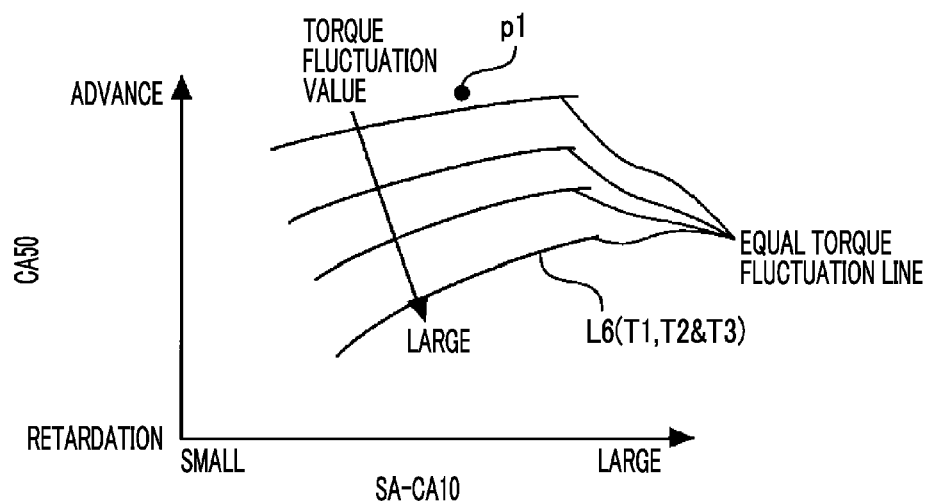
FIG. 7 is a view illustrating the torque fluctuation limit lines in a relationship between a ignitionability index SA-CA10 and a crank angle CA50.

Meanwhile, FIG. 7 is a view illustrating the torque fluctuation limit lines in a relationship between SA-CA10 and CA50. All of the individual lines illustrated in FIG. 7 are equal torque fluctuation lines. The individual torque fluctuation lines have a tendency in which CA50 is advanced as SA-CA10 is larger. As illustrated in FIG. 7, a line on a highest torque fluctuation side among these torque fluctuation lines is a torque fluctuation limit line L6. Hereinafter, a map that has the tendency as illustrated in FIG. 7 and defines the relationship between SA-CA10 and CA50 and the torque fluctuation limit lines may be referred to as a "torque fluctuation limit evaluation map" for convenience of description.

The present application inventors have found out that the torque fluctuation limit lines can be considered to be the same, irrespective of changes in the intake air temperature, in a case where the torque fluctuation limit lines are arranged in the relationship between SA-CA10 and CA50. For this reason, even in a case where changes in the intake air temperature is taken into consideration, as illustrated in FIG. 7, it is possible to illustrate the torque fluctuation limit lines with one torque fluctuation limit line L6. Additionally, as one of the environmental conditions assumed in the present embodiment, description has been performed herein by taking the intake air temperature as an example. In this regard, the present application inventors have utilized the ignitionability index value (for example, SA-CA10) and the combustion timing index value (for example, CA50) as the engine parameters that define the relationship with the torque fluctuation limit value, and thereby have confirmed that the torque fluctuation limit lines can be considered to be the same irrespective of changes in environmental conditions, such as engine cooling water temperature, engine lubrication oil temperature, and an octane number, in addition to the intake air temperature.

Here, although not a configuration used in the present embodiment, a configuration in which the retardation of the ignition timing is performed utilizing the relationship between the ignition timing and the air-fuel ratio and the torque fluctuation limit value, as illustrated in FIG. 6, can be considered. Specifically, there is considered a configuration in which such a relationship is provided as a map, and in a case where a retardation request for the ignition timing is issued during the lean burn operation, the retardation of the ignition timing is performed, determining allowances for the operating point p and the torque fluctuation limit lines with reference to the map. However, in a case where the relationship illustrated in FIG. 6 is utilized, a plurality of torque fluctuation limit lines are used if changes in the environmental conditions are taken into consideration. Hence, in this case, as already described with reference to FIGS. 5A and 5B, it is necessary to estimate the allowances in consideration of changes in the environmental conditions (intake air temperature condition) and to define the torque fluctuation limit lines. For this reason, a torque fluctuation limit line to be stored in the map in the example illustrated in FIG. 6 becomes a torque fluctuation limit line L3 corresponding to the intake air temperature T1 that is a minimum value to be assumed. As a result, in a case where a retardation request for the ignition timing is issued for reducing the knocking level because the intake air temperature has become a temperature higher than the standard air temperature T2, the allowance for retardation is determined between the current operating point p and the torque fluctuation limit line L3. For this reason, irrespective of there is an allowance for a torque fluctuation limit line corresponding to an actual intake air temperature, it is impossible to perform the retardation of the ignition timing to the vicinity of the torque fluctuation limit line.

Meanwhile, in the present embodiment, the torque fluctuation limit value is defined utilizing SA-CA10 and CA50. It becomes unnecessary to give the allowances to the torque fluctuation limit lines in consideration of the environmental conditions that vary with respect to the standard environmental conditions that have determined the torque fluctuation limit evaluation map. For this reason, the torque fluctuation limit lines can be appropriately ascertained regardless of the presence/absence of changes in the environmental conditions.

In the present embodiment, the knocking control using the torque fluctuation limit evaluation map utilizing SA-CA10 and CA50 is executed. Specifically, in a case where detection of knocking is received and a retardation request for the ignition timing for reducing the knocking level is issued, with reference to the torque fluctuation limit evaluation map, a distance Y between the current operating point p and a point q on a torque fluctuation limit line is calculated. The distance Y represents the allowance for retardation of the ignition timing. More specifically, the distance Y is equivalent to an allowance until a torque fluctuation value reaches the torque fluctuation limit value due to the retardation of the ignition timing.

Figure 8:
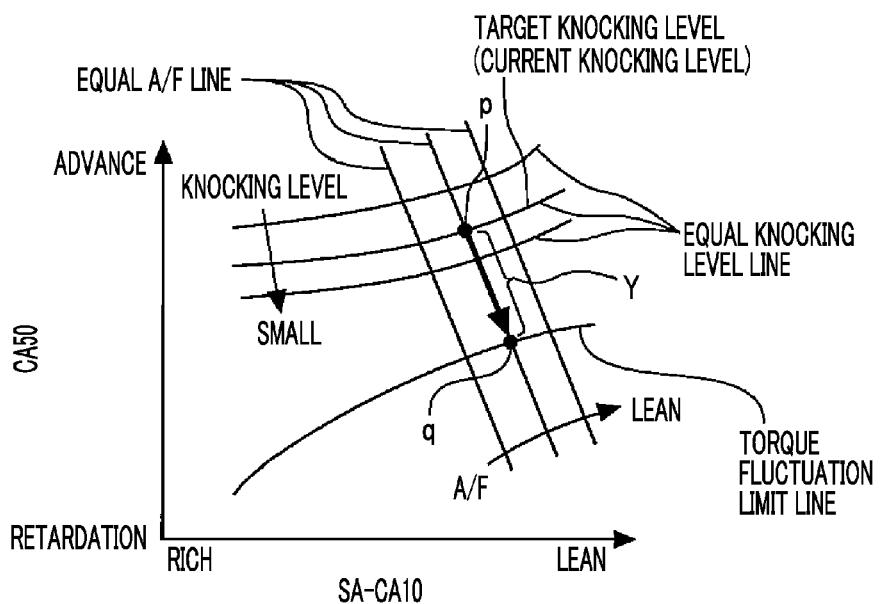
FIG. 8 is a view for describing a technique of calculating a distance Y.

FIG. 8 is a view for describing a technique of calculating the distance Y. In FIG. 8, a plurality of knocking level lines including a target knocking level line are exemplified.

In the knocking control, a retardation request for reducing the knocking level may be issued. More specifically, the target knocking level line on which the current operating point p in FIG. 8 (suiting point p1) is located is specified in advance as a line in the standard environmental conditions. For this reason, in a case where a change to an environmental condition under which the knocking level becomes higher compared to the standard environmental conditions has occurred, the knocking level of the operating point p becomes higher than the target knocking level. In such a case, a retardation request for the ignition timing is issued.

The distance Y, as illustrated in FIG. 8, is a distance between a point p and a point q on an xy plane in a case where SA-CA10 is used as an x-coordinate value and CA50 is used as a y-coordinate value. A direction in which the operating point p should proceed on FIG. 8 when a retardation request for reducing the knocking level is issued may be an arbitrary direction if the direction is a direction in which the knocking level is lowered. However, in order to calculate the distance Y, it is necessary to specify the position of the point q on a torque fluctuation limit line. In the knocking control of the present embodiment, as an example, performing the retardation of the ignition timing without changing the air-fuel ratio (A/F) is a policy. For this reason, as illustrated in FIG. 8, the point q is defined as an intersection point between an equal A/F line (equal air-fuel ratio line) passing through the operating point p, and the torque fluctuation limit line. In this way, the distance Y used in the present embodiment is a distance between the point p in a specific direction (as an example, a direction along the equal A/F line) that is determined in advance, and the point q on the torque fluctuation limit line.

The calculation of the distance Y (the unit thereof is a crank angle) can be performed utilizing the following Formula (4) using the Pythagorean theorem.

$$Y = \sqrt{Y^1 + Y^2} \quad (4)$$

In the above Formula (4), Y1 is a difference between CA50 at the point p and CA50 at the point q, and Y2 is a difference between SA-CA10 at the point p and SA-CA10 at the point q.

In the knocking control of the present embodiment, in a case where a retardation request is issued, it is determined whether or not the distance Y calculated as described above is longer than a threshold value Z. As a result, in a case where the distance Y is longer than the threshold value Z, that is, in a case where it can be determined that the current operating point p is a position having an allowance for the torque fluctuation limit line, the operating of retarding the ignition timing by the predetermined amount R1 is executed. In this case, since not changing the air-fuel ratio is a policy in the retardation of the ignition timing as described above, the operating point p moves in a direction indicated by an arrow in FIG. 8 due to the retardation of this ignition timing.

The threshold value Z used for the above determination may be zero or may be a positive value. In a case where the threshold value Z is set to a positive value, the movement range of the operating point p can be limited such that the allowance for the torque fluctuation limit line remains, in consideration of variations or the like in the control of the fuel injection amount for ignition timing control or enrichment of the air-fuel ratio to be described below. In the present embodiment, as an example of preferable setting, the threshold value Z is a positive value that varies according to the air-fuel ratio. More specifically, in a case where the air-fuel ratio is large in the lean air-fuel ratio region, the threshold value Z is set so as to become larger compared to a case where the air-fuel ratio is small. The torque fluctuation is apt to become larger as the air-fuel ratio becomes leaner in the lean air-fuel ratio region. For this reason, according to this setting, since the air-fuel ratio has a lean value, an allowance for which the above variation or the like is taken into consideration can be made high in a case where the torque fluctuation is apt to become large. In this way, according to this setting, in a case where an allowance is provided using a positive value as the threshold value Z, the magnitude of the allowance can be appropriately set according to the air-fuel ratio. In addition, the threshold value Z may be set so as to vary continuously in an aspect in which the threshold value becomes larger as the air-fuel ratio is larger, or may be set so as to vary stepwisely in at least two steps in the above aspect. As in this example, the threshold value Z may be not a fixed value but a variable value.

Additionally, in the knocking control of the present embodiment, in a case where the distance Y is equal or smaller than the threshold value Z, that is, in a case where it can be determined that the allowance for retardation of the ignition timing is small because the operating point p is close to the torque fluctuation limit line, the following control (an example of a second control) is executed.

Figure 9:
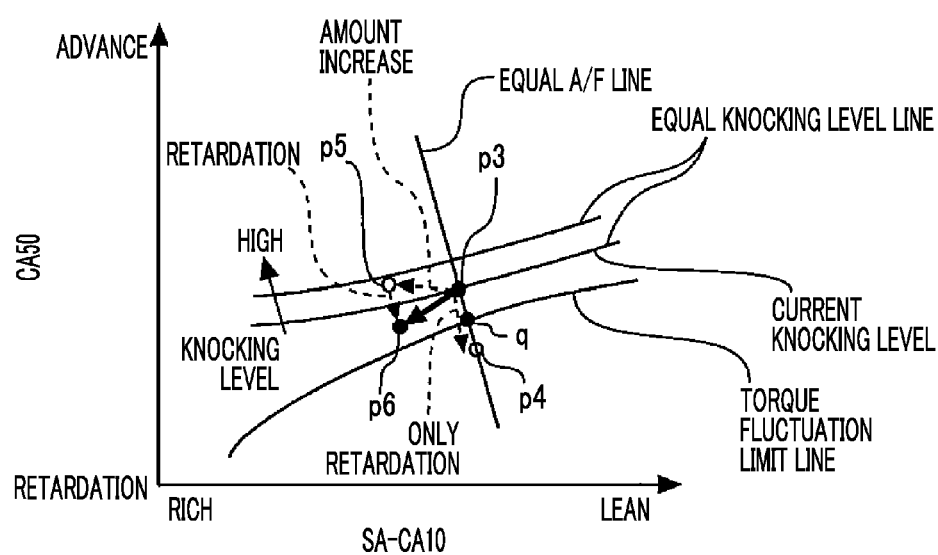
FIG. 9 is a view for describing control in a case where the distance Y is determined to be equal to or smaller than a threshold value Z.

FIG. 9 is a view for describing control in a case where the distance Y is determined to be equal to or smaller than the threshold value Z. In a case where the distance Y becomes equal to or smaller than the threshold value Z, if the ignition timing for reducing the knocking level is retarded by the predetermined amount R1 similar to a case where the distance Y becomes smaller than the threshold value Z, the operating point p may move as illustrated in FIG. 9 according to the setting of the magnitude of the threshold value Z and the magnitude c of the predetermined amount R1. That is, in the case exemplified herein, the operating point p moves from an operating point p3 to an operating point p4. In a case where the operating point p has moved in this way, the torque fluctuation value exceeds the torque fluctuation limit value. Additionally, even if the torque fluctuation value does not exceed the torque fluctuation limit value due to the retardation in the predetermined amount R1, the operating point p considerably approaches the torque fluctuation limit line. Therefore, in the present embodiment, in a case where the distance Y becomes equal to or smaller than the threshold value Z, enrichment of the air-fuel ratio is executed for the purpose of an improvement in the combustion stability together with the retardation of the ignition timing. The enrichment of this air-fuel ratio can be executed by the increase in the amount of injected fuel.

If the air-fuel ratio is enriched, the combustion speed becomes high and an ignition delay period becomes short. As a result, CA50 is advanced and SA-CA10 becomes small. For this reason, if the fuel injection amount for enrichment increases by a predetermined amount F, the operating point p moves from the operating point p3 to the operating point p5. In this way, according to the enrichment of the air-fuel ratio, combustion can be stabilized and the operating point p can be separated from the torque fluctuation limit line. However, the knocking level becomes higher than the current knocking level only in the enrichment. As in the operating point p3 illustrated in FIG. 9, the reason why the operating point p is located in a place close to the torque fluctuation limit line is because the retardation of the ignition timing is performed such that the knocking level is maintained at the target knocking level after there has been a variation to the environmental conditions under which the knocking level is apt to become higher than that under the standard environmental conditions. For this reason, it can be said that the current knocking level in the operating point p3 is equivalent to the target knocking level. Hence, it can be said that it is not preferable that the knocking level becomes high due to the enrichment.

Therefore, in the present embodiment, when the distance Y becomes equal to or smaller than the threshold value Z in a case where a retardation request is issued, as in an operating point p6 in FIG. 9, the value of the increase in the amount of injected fuel for enrichment and the retardation amount of the ignition timing are determined such that an operating point falls within a region between the equal knocking level line corresponding to the current knocking level, and the torque fluctuation limit line. As a result, in a case where enrichment and retardation in control amount that is determined in this way are executed in the operating point p3, the operating point p moves from the operating point p3 to the operating point p6. In this way, even in a case where the operating point p sufficiently approaches the torque fluctuation limit line by performing the retardation of the ignition timing while improving the combustion stability, a retardation request for reducing the knocking level can be satisfied while the operating point is prevented from exceeding the torque fluctuation limit.

Figure 10:
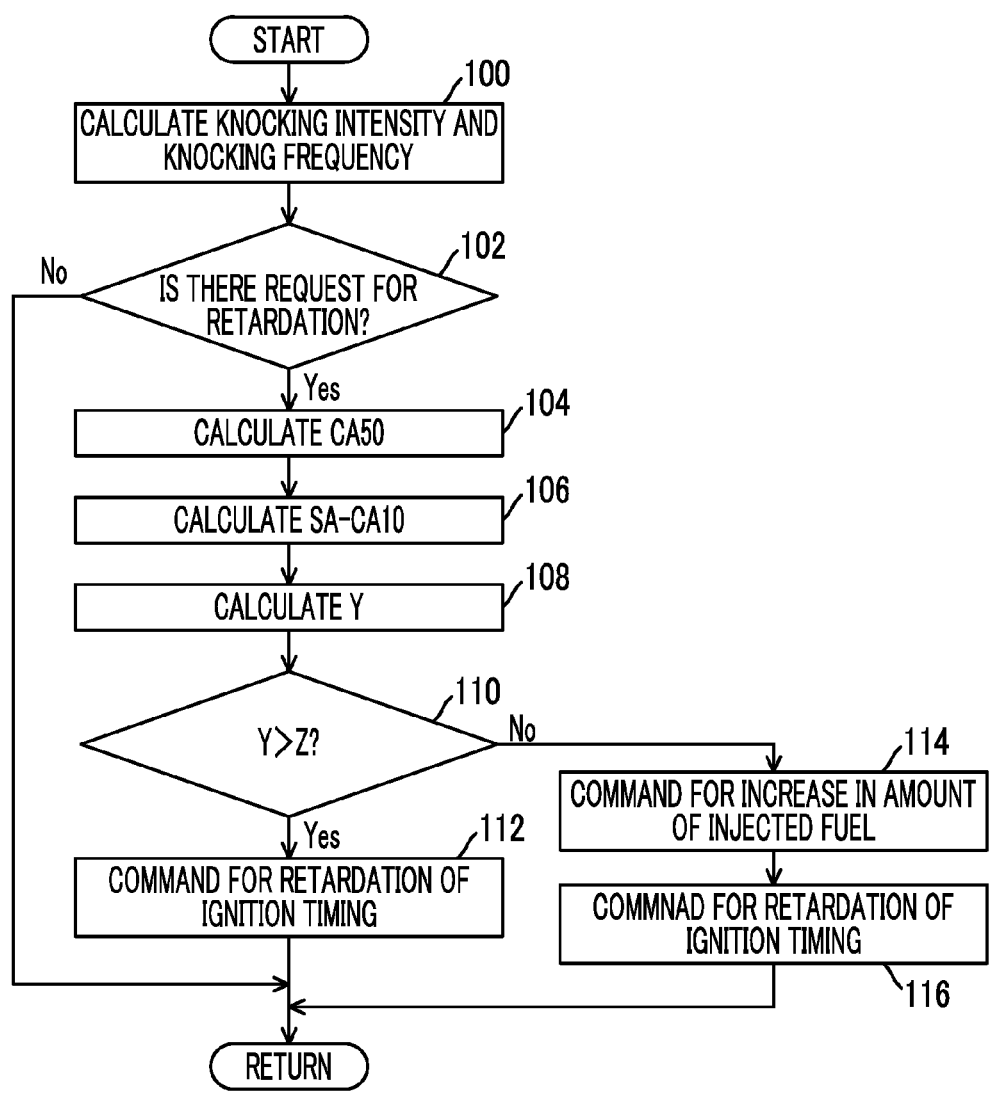
FIG. 10 is a flowchart of a routine to be executed in Embodiment 1.

Next, FIG. 10 is a flowchart illustrating a control program executed in Embodiment 1 at the time of the lean burn operation. In addition, a main routine is started at a timing past the opening timing of the exhaust valve 22 in each cylinder, and is repeatedly executed for each combustion cycle. That is, the timing when the main routine is executed is a timing when acquisition of data of the in-cylinder pressure P serving as the foundation of calculation of the actually measured data of MFB is terminated.

In a routine illustrated in FIG. 10, the ECU 40 first calculates the knocking intensity and the knocking frequency (Step 100). Specifically, the knocking intensity at the time of combustion in the current combustion cycle is calculated on the basis of an output signal of the knocking sensor 46. Additionally, the knocking frequency is calculated as a frequency at which knocking of the knocking intensity of the target knocking level that is set in advance occurs during a plurality of predetermined cycles (also including the current combustion cycle).

Next, the ECU 40 determines whether or not there is a retardation request for the ignition timing for reducing the knocking level (Step 102). The retardation request is issued in a case where the current knocking level is higher than the target level. The case where the current knocking level is higher than target level is, specifically, a case where the knocking intensity calculated in Step 100 is larger than the knocking intensity of the target knocking level, or a case where the knocking frequency calculated in Step 100 is higher than the knocking frequency of the target knocking level.

The ECU 40 rapidly terminates this processing cycle in a case where it is determined that there is no retardation request in Step 102. In addition, in a case where it is determined that there is no retardation request (that is, in a case where the knocking level is equal to or lower than the target knocking level), it is determined in a routine (not illustrated) executed apart from the routine illustrated in FIG. 10 whether or not a period for which the knocking level is determined to be equal to or lower than the target knocking level has lasted for a predetermined period. As a result, in a case where this determination is established, the ignition timing retardation amount reflected in the basic ignition timing is corrected on a small scale by a predetermined amount. That is, the target ignition timing is advanced with respect to the current value.

Meanwhile, in a case where the ECU 40 determines that there is a retardation request in Step 102, the processing proceeds to Step 104. In Step 104, CA50 is calculated utilizing the actually measured data of MFB calculated using an output value of the in-cylinder pressure sensor 30. Next, the ECU 40 calculates SA-CA10 (Step 106). SA-CA10 is calculated as a difference between the target ignition timing in used in the current combustion cycle and CA10 that after CA10 is calculated utilizing the actually measured data of MFB.

Next, the ECU 40 calculates the distance Y (Step 108). The ECU 40 stores the torque fluctuation limit evaluation map in which the relationship between SA-CA10 and CA50, and the torque fluctuation limit is defined, in a tendency as illustrated in FIG. 7. The torque fluctuation limit evaluation map is defined as the relationship in the standard environmental conditions, as already described. Additionally, a different map according to the operation conditions (for example, the engine load and the engine rotation speed) of the internal combustion engine 10 is used as the torque fluctuation limit evaluation map. In this Step 108, the distance Y between the current operating point p and the point q on the torque fluctuation limit line is calculated by the technique already described with reference to FIG. 8. Additionally, the threshold value Z used for the main determination is made variable according to the air-fuel ratio, as already described. Hence, the main determination is executed after the threshold value Z is acquired according to the air-fuel ratio. In addition, the air-fuel ratio for acquiring the threshold value Z can be calculated, for example, using the amount of intake air and the fuel injection amount (target fuel injection amount) that are acquired using the air flow sensor 44.

Next, the ECU 40 determines whether or not the distance Y is longer than the threshold value Z (Step 110). As a result, in a case where it is determined that the distance Y is longer than the threshold value Z, that is, in a case where it can be determined that the current operating point p is at a position where there is an allowance for the torque fluctuation limit line, the ECU 40 outputs a retardation command of the ignition timing to the ignition device 28 (Step 112). As a result, the ignition timing used in the combustion cycle of each cylinder performed after this retardation command is retarded. In addition, since CA50 and SA-CA10 are calculated for each cylinder according to the processing of the main routine, a target of this retardation command may be only the cylinder about which CA50 and SA-CA10 for determination of Step 110 are calculated. That is, control utilizing the torque fluctuation limit evaluation map may be executed for each cylinder.

Figure 11A:
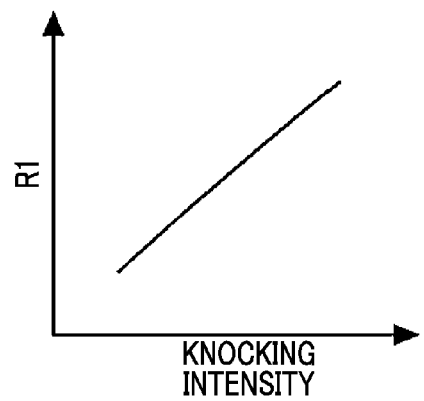
FIG. 11A is a view for describing a technique of calculating the retardation amount (predetermined amount R1) of the ignition timing.
Figure 11B:
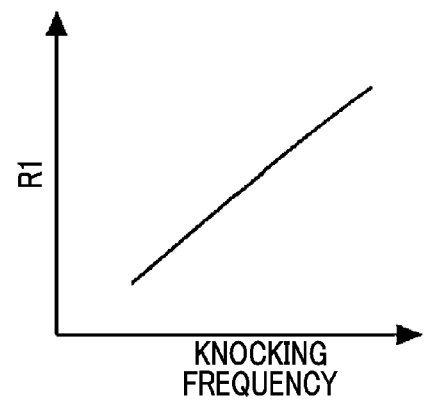
FIG. 11B is a view for describing the technique of calculating the retardation amount (predetermined amount R1) of the ignition timing.

As already described, the target ignition timing is a value obtained by adding the ignition timing retardation amount to the basic ignition timing. The basic ignition timing can be calculated with reference to a map (not illustrated) in which a relationship between the operation conditions (for example, the engine load, the engine rotation speed, and the air-fuel ratio) of the internal combustion engine 10, and the basic ignition timing is determined. According to the processing of this Step 112, the predetermined amount R1 for increasing the retardation amount to the current ignition timing retardation amount is added in accordance with the above retardation request. The predetermined amount (that is, single retardation amount) R1 has a value such that the torque fluctuation limit line is not exceeded. In addition, in this Step 112, the predetermined amount R1 is calculated with reference to the relationship illustrated in FIGS. 11A and 11B, as an example. That is, as illustrated in FIG. 11A, the predetermined amount R1 is calculated as a larger value as the knocking intensity calculated in Step 100 is larger. Additionally, as illustrated in FIG. 11B, the predetermined amount R1 is calculated as a larger value as the knocking frequency calculated in Step 100 is higher. Depending on the predetermined amount R1 calculated in this way, first, the ignition timing retardation amount is corrected from the current value (the value stored in the memory 40a), and is stored in the memory 40a. Then, the target ignition timing is corrected by the corrected ignition timing retardation amount being added to the basic ignition timing. Hence, according to the above retardation command, the target ignition timing corrected in this way is commanded. In addition, the above predetermined amount (single retardation amount) R1 may be a fixed value or may be a value that is made variable according to, for example, any one of the knocking intensity or the knocking frequency, instead of the above one.

Meanwhile, in a case where it is determined that the distance Y is equal to or smaller than the threshold value Z in Step 110, that is, in a case where it can be determined that the allowance for retardation of the ignition timing is small because the operating point p is close to the torque fluctuation limit line, the ECU 40 outputs a command for the increase in the amount of injected fuel for enriching the air-fuel ratio, and a retardation command of the ignition timing by processing of Steps 114 and 116. These kinds of processing are executed in order to satisfy a retardation request while guaranteeing combustion stability. As a result, the fuel injection amount used in the combustion cycle of each cylinder performed after this increase-in-amount command and this retardation command is increased, and the ignition timing is retarded. In addition, similar to the case of processing of Step 110, a target of the increase-in-amount command and the retardation command by the processing of Steps 114 and 116 may be only the cylinder about which CA50 and SA-CA10 for determination of Step 110 are calculated. In this way, regarding the processing of Steps 114 and 116, control utilizing the torque fluctuation limit evaluation map may also be executed for each cylinder.

The target fuel injection amount is a value obtained by adding various fuel injection correction amounts to the basic fuel injection amount. The basic fuel injection amount can be calculated with reference to a map (not illustrated) in which a relationship between the operation conditions (for example, the engine load, the engine rotation speed, and the air-fuel ratio) of the internal combustion engine 10, and the basic fuel injection amount is determined. According to the processing of this Step 114, in order to increase the amount of injected fuel for the purpose of guaranteeing the combustion stability at the time of the retardation of the ignition timing, a predetermined amount F is added to the fuel injection correction amount relating to knocking. The predetermined amount F is a fixed value as an example. The target fuel injection amount is corrected by the fuel injection correction amount corrected depending on the predetermined amount F being added thereto. According to the above increase-in-amount command, the target fuel injection amount corrected in this way is commanded.

Next, in Step 116, the current ignition timing retardation amount is corrected depending on a predetermined amount R2, and the target ignition timing to be commanded according to this retardation command is corrected by adding the corrected ignition timing retardation amount to the basic ignition timing. The predetermined amount R2 can be determined by the following technique as an example.

That is, in this Step 116, in a situation where the increase in the amount of injected fuel in the predetermined amount F is performed by the processing of Step 114, the above predetermined amount R2 is calculated as a value for satisfying a requirement such that the operating point p does not exceed the equal knocking level line corresponding to the current knocking level and does not exceed the torque fluctuation limit line.

Here, the following relationship is present in the sensitivity of changes of CA50 and SA-CA10 resulting from the increase in the amount of injected fuel and the retardation of the ignition timing, respectively. That is, the advance amount of CA50 when the amount of injected fuel is increased by a predetermined amount is defined as X1, and the decrease amount of SA-CA10 is defined as X2. The increase amount of SA-CA10 when the retardation of the ignition timing is performed with such an amount that CA50 is retarded by the same amount as X1 becomes smaller than X2. Since there is such a relationship, the operating point p is moved by combining the increase in the amount of injected fuel with the retardation of the ignition timing such that CA50 is retarded and SA-CA10 decreases (refer to FIG. 9). Hence, the predetermined amount R2 of the ignition timing retardation amount that satisfies the above requirement can be determined in advance. A map (not illustrated) in which a relationship between the operation conditions (for example, the engine load (engine torque), the engine rotation speed, and the air-fuel ratio) of the internal combustion engine 10 and the above predetermined amount R2 is determined is stored in the ECU 40. In this Step 116, the ignition timing retardation amount is corrected using the predetermined amount R2 acquired with reference to such a map. In addition, in the processing of the above-described Steps 114 and 116, an example in which the predetermined amount R2 of the ignition timing retardation amount is acquired with reference to the above map in a situation where the increase in the amount of injected fuel is performed by the predetermined amount F that is a fixed value has been described. However, the predetermined amount F and the predetermined amount R2 may be values that can satisfy the above requirement. Hence, instead of or together with the predetermined amount R2, the predetermined amount F is determined according to the operation conditions.

According to the routine illustrated in FIG. 10 described above, in a case where a retardation request for the ignition timing is issued, it is determined with reference to the torque fluctuation limit evaluation map whether or not the distance Y is larger than the threshold value Z. That is, the allowance of the operating point p to the torque fluctuation limit line is ascertained regarding the retardation of the ignition timing. In the torque fluctuation limit evaluation map, the torque fluctuation limit value is defined in the relationship between SA-CA10 that is a parameter representing the ignition delay period, and CA50 that is a parameter representing combustion timing. According to this map from which the engine parameters are selected in this way, it is not necessary to give an allowance to the torque fluctuation limit line in consideration of changes in the environmental conditions (the above-described intake air temperature condition or the like). For this reason, when the ignition timing is retarded, a true torque fluctuation limit line can be appropriately ascertained without being influenced by the presence/absence of changes in the environmental conditions. As a result, the distance Y between the current operating point p and the point on the torque fluctuation limit line (the point q in the present embodiment) can be appropriately ascertained.

In addition, according to the above routine, the ignition timing accompanied with the retardation request is retarded in a case where the distance Y is larger than the threshold value Z (an example of a first control). Meanwhile, in a case where the distance Y becomes equal to or smaller than the threshold value Z, the enrichment (the increase in the amount of injected fuel) of the air-fuel ratio for suppressing an increase in the torque fluctuation and the retardation of the ignition timing accompanied with the retardation request are executed. By performing such control using the torque fluctuation limit evaluation map, the retardation of the ignition timing can sufficiently be utilized to the vicinity of the true torque fluctuation limit line. Additionally, irrespective of being in a situation where there is an allowance for the torque fluctuation limit line under actual environmental conditions, a situation where the enrichment of the air-fuel ratio is performed for avoidance of exceeding the torque fluctuation limit line can be avoided. For this reason, fuel efficiency degradation can be suppressed. Additionally, an increase in the amount of NOx discharge resulting from the enrichment of the air-fuel ratio can also be suppressed. According to this control, the increase in amount and the retardation that are performed in the vicinity of the torque fluctuation limit line can be performed without the necessity for actually calculating the torque fluctuation value for each combustion cycle. If a configuration in which calculation of the torque fluctuation value is performed is provided unlike this control, a situation where an actual torque fluctuation value exceeds the torque fluctuation limit value may occur before the calculation is completed. In contrast, according to this control, it can also be avoided that the torque fluctuation increases in such an aspect.

Additionally, according to the above routine, in a case where the distance Y is equal to or smaller than the threshold value Z, the increase in the amount of injected fuel using the above predetermined amount F, and the retardation of the ignition timing using the predetermined amount R2 are executed. Accordingly, the knocking level can be reduced while being prevented from exceeding the torque fluctuation limit value.

In addition, the predetermined amount F of the fuel injection amount and the retardation amount (predetermined amount R2) of the ignition timing are examples of "the value of the increase in the amount of injected fuel for enrichment of the air-fuel ratio and the retardation amount of the ignition timing" in second control.

By the way, in the above-described Embodiment 1, an example in which a point on the torque fluctuation limit line used for calculation of the distance Y, as illustrated in FIG. 8, is specified as an intersection point between the equal A/F line passing through the operating point p, and the torque fluctuation limit line has been described. However, as already described, the direction in which the operating point p should proceed on the xy plane when a retardation request for reducing the knocking level is issued may be a direction in which the knocking level is lowered, and is not limited to the above aspect.

Figure 12:
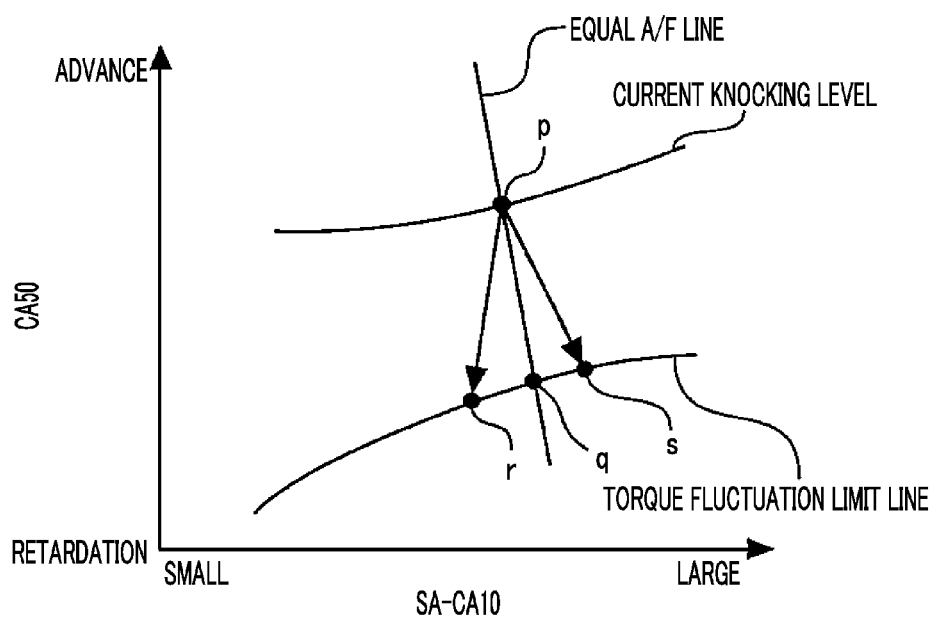
FIG. 12 is a view for describing another example of the calculation of the distance Y.

FIG. 12 is a view for describing another example of the calculation of the distance Y. In Embodiment 1, in a case where the distance Y is larger than the threshold value Z, only the retardation of the ignition timing is performed. However, the retardation of the ignition timing in this case may be accompanied with enrichment of the air-fuel ratio for an improvement in the combustion stability, and contrary to the above, may be accompanied with enleanment of the air-fuel ratio in order to make the retardation amount of the ignition timing required for knocking suppression small. Hence, the direction in which the operating point p proceeds in a case where the distance Y is larger than threshold value Z may become a direction facing a side where SA-CA10 is smaller than the equal A/F line as exemplified in FIG. 12, and may become a direction facing a side where SA-CA10 is larger than the equal A/F line, according to a previous control policy. The direction in which the operating point p proceeds is determined when determining an increase-in-amount value (or decrease-in-amount value) of injected fuel, and the retardation amount (predetermined amount R1) of the ignition timing according to a previous control policy. Hence, a point r (or a point s) on the torque fluctuation limit line used for calculation of the distance Y can be defined, for example, as follows. That is, a relationship between the increase-in-amount value (or decrease-in-amount value) and the retardation amount, and the inclination, on the xy plane, of a line passing through the operating point p and indicating a movement direction of the operating point p is determined in advance. Next, the above line is specified by acquiring the inclination on the basis of the increase-in-amount value (or decrease-in-amount value) and each acquisition value of the retardation amount. The point r (or the point s) equivalent to the intersection point between the specified line and the torque fluctuation limit line is specified. In a case where the retardation of the ignition timing is accompanied with the increase or decrease in the fuel injection amount for increase and decrease of the air-fuel ratio in this way, the processing of outputting commands (the retardation command and a command for changing the fuel injection amount) based on the increase-in-amount value (or decrease-in-amount value) and the retardation amount (predetermined amount R1) that are determined as described above may be performed when the determination of Step 110 is established in the routine illustrated in FIG. 10. Additionally, according to a previous control policy, the movement direction of the operating point p is not limited to being made always the same. That is, the direction in which the operating point p proceeds is changed depending on whether or not there are other requirements during execution of the retardation of the ignition timing. For example, in a case where other requirements for suppressing the torque fluctuation are issued when the retardation of the ignition timing is continuously performed such that the operating point p proceeds in the direction along the equal A/F line, the movement direction of the operating point p may be corrected to the direction facing the side where SA-CA10 is smaller than the equal A/F line. In a case where the movement direction of the operating point p is corrected in this way, the distance Y may be calculated as a distance between an intersection point between a line indicating the movement direction after the correction, and the torque fluctuation limit line, and the current operating point p.

Moreover, instead of the above-described technique, the distance Y may be simply and easily calculated and evaluated as a distance (a distance between a point on the torque fluctuation limit line where the shortest distance is obtained, and the operating point p) between the current operating point p and the torque fluctuation limit line.

Additionally, in Embodiment 1, an example in which the control utilizing the torque fluctuation limit evaluation map during the lean burn operation is performed has been described. However, a target to which this control is applied may not be limited to the lean burn operation, and may be, for example, the stoichiometric air-fuel ratio combustion operation. More specifically, for example, in a case where a large amount of EGR gas is introduced basically even during stoichiometric air-fuel ratio combustion operation in which it can be said that the combustion stability becomes higher compared to during the lean burn operation, the torque fluctuation is apt to become large. Hence, in such a case, this control may be applied while utilizing enrichment of the air-fuel ratio within a range where the combustion stability is improved, if necessary in order to suppress an increase in the torque fluctuation.

Additionally, in Embodiment 1, CA50 is exemplified in as the combustion timing index value. However, the "combustion timing index value" in the disclosure may be an index value representing the combustion timing, and instead of CA50, may be, for example, an in-cylinder pressure maximum crank angle $\theta_{Pmax}$ or may be an arbitrary specific rate combustion point $CA\alpha1$ other than CA50. In addition, $\theta_{Pmax}$ can be acquired utilizing the actually measured data of the in-cylinder pressure P. Additionally, in the present embodiment, SA-CA10 is exemplified as the ignitionability index value. However, the "ignitionability index value" in the disclosure may be an index value representing the ignitionability of the air-fuel mixture, and instead of SA-CA10, may be, for example, a crank angle period from the ignition timing (SA) to an arbitrary specific rate combustion point $CA\alpha2$ other than CA10.

Additionally, in Embodiment 1, description has been made by taking retardation control (retardation control performed during the knocking control) of the ignition timing when a retardation request for reducing the knocking level is issued, as an example. Here, the knocking level may be defined by any one of the knocking intensity and the knocking frequency, instead of being defined by both of the knocking intensity and the knocking frequency as described above. For this reason, for example, a requirement issued in a simple configuration in which it is determined that knocking has occurred in a case where the knocking intensity is equal to or larger than a determination threshold value and retardation is performed in a case where it is determined that knocking has occurred is also included in the retardation request for reducing the knocking level.

Moreover, a target for which relevant information (relevant information that defines the torque fluctuation limit value in a relationship between the ignitionability index value and the combustion timing index value) in the disclosure is utilized is not limited to a case where a retardation request for knocking suppression is issued. That is, in a case where a retardation request for another purpose, for example, a retardation request for warming-up of the exhaust cleaning catalyst 32 is issued, the retardation of the ignition timing may be executed utilizing the above relevant information. In a case where the distance Y becomes equal to or smaller than the threshold value Z, the ignition timing may be retarded in order to satisfy the retardation request while performing enrichment of the air-fuel ratio for suppressing the torque fluctuation. Moreover, in a case where the distance Y becomes equal to or smaller than the threshold value Z in a situation where a retardation request for a purpose other than the knocking suppression issued, it is not necessary to suppress the combustion speed for knocking suppression. For this reason, the predetermined amount F of injected fuel for enrichment of the air-fuel ratio in this case may be an amount required for securement of an allowance for retardation in the predetermined amount R2 (retardation amount) that satisfies the retardation request. That is, in this case, the combustion timing index value, such as CA50, may be allowed to proceed to the advanced side due to the enrichment.

Additionally, in Embodiment 1, an example in which knocking detection is performed using the knocking sensor 46 of a type in which vibration transmitted to the cylinder block has been described. However, the "knocking detection means" of the disclosure may be, for example, one that detects knocking using the in-cylinder pressure sensor 30, instead of the knocking sensor 46 of the above type. Specifically, for example, a peak value of the intensity of the output signal (that is, a knocking determination signal) of the in-cylinder pressure sensor 30 in the predetermined crank angle period for knocking detection may be calculated as the knocking intensity, or an integration value of the intensity of the knocking determination signal may be calculated as the knocking intensity.

Additionally, in Embodiment 1, an example in which the torque fluctuation limit evaluation map is used as an example of the "relevant information" related to the disclosure has been described. However, the "relevant information" related to the disclosure is not necessarily limited to information that is constructed in the form of a map and stored within the control device, and for example, may be constructed and stored in the form of a relational expression that defines a relationship between the ignitionability index value and the combustion timing index value, and the torque fluctuation limit value.

Additionally, in Embodiment 1, the control (refer to FIG. 10) in which CA50 and SA-CA10 based on the output value of the in-cylinder pressure sensor 30 of each cylinder is applied to the torque fluctuation limit evaluation map (relevant information) has been described taking the internal combustion engine 10 of the configuration including the in-cylinder pressure sensor 30 in each cylinder as an example. However, when this control is performed, at least one cylinder may include the in-cylinder pressure sensor 30. Hence, for example, the in-cylinder pressure sensor 30 may be installed by using one specific cylinder as a representative cylinder, and CA50 and SA-CA10 based on the output value of the in-cylinder pressure sensor 30 may be applied to the torque fluctuation limit evaluation map. Retardation of the ignition timing of other cylinders including the representative cylinder may be performed according to an evaluation result of the torque fluctuation limit (together with enrichment of the air-fuel ratio if necessary).

What is claimed is:
1. A control device for an internal combustion engine,
the internal combustion engine including an ignition device, a fuel injection valve, and an in-cylinder pressure sensor,
the ignition device being configured to ignite an air-fuel mixture within a cylinder of the internal combustion engine,
the fuel injection valve being configured to supply fuel into the cylinder, and
the in-cylinder pressure sensor being configured to detect in-cylinder pressure,
the control device comprising
an electronic control unit configured to:
calculate an ignitionability index value and a combustion timing index value, based on an output value of the in-cylinder pressure sensor;

store relevant information that defines a relationship between the ignitionability index value and the combustion timing index value, and a torque fluctuation limit value;

store a torque fluctuation limit line based on the relevant information;

calculate a distance between a current operating point of the internal combustion engine and a point on the torque fluctuation limit line, on an xy plane having the ignitionability index value as an x-coordinate value and having the combustion timing index value as a y-coordinate value, the current operating point being specified by the ignitionability index value and the combustion timing index value;

execute a first control in which the ignition device is controlled such that ignition timing is retarded, when the distance is larger than a threshold value; and execute a second control in which the fuel injection valve is controlled such that an air-fuel ratio is enriched and the ignition device is controlled such that the ignition timing is retarded, when the distance is equal to or smaller than the threshold value.

2. The control device according to claim 1, wherein the internal combustion engine further includes a knocking detector that detects knocking, and wherein the electronic control unit is configured to:

retard the ignition timing when the distance is larger than the threshold value in a case where knocking is suppressed based on a detection result of the knocking detector, in the first control; and retard the ignition timing and enrich the air-fuel ratio when the distance is equal to or smaller than the threshold value in a case where knocking is suppressed based on the detection result of the knocking detector, in the second control.

3. The control device according to claim 2, wherein the electronic control unit is configured to determine, in the second control, a value of an increase in an amount of injected fuel for enrichment of the air-fuel ratio and a retardation amount of the ignition timing such that, on the xy plane, the operating point does not exceed an equal knocking level line corresponding to a current knocking level and does not exceed the torque fluctuation limit line, and the equal knocking level line in which a knocking level is constant is defined based on at least one of knocking intensity and knocking frequency.

4. The control device according to claim 1, wherein the internal combustion engine is an internal combustion engine in which a lean burn operation is performed in a lean air-fuel ratio larger than a stoichiometric air-fuel ratio, and wherein the threshold value when the lean air-fuel ratio is large is larger than the threshold value when the lean air-fuel ratio is small.

5. The control device according to claim 1, wherein the electronic control unit is configured to calculate a shortest distance between the current operating point and the torque fluctuation limit line as the distance.

6. The control device according to claim 1, wherein the electronic control unit is configured to calculate a distance between the current operating point and an intersection point between an equal air-fuel ratio line passing through the current operating point and the torque fluctuation limit line as the distance.

7. A control method for an internal combustion engine, the internal combustion engine including an ignition device, a fuel injection valve, and an in-cylinder pressure sensor, the ignition device being configured to ignite an air-fuel mixture within a cylinder of the internal combustion engine, the fuel injection valve being configured to supply fuel into the cylinder, and the in-cylinder pressure sensor being configured to detect in-cylinder pressure, the control method comprising:

calculating an ignitionability index value and a combustion timing index value, based on an output value of the in-cylinder pressure sensor;

storing relevant information that defines a relationship between the ignitionability index value and the combustion timing index value, and a torque fluctuation limit value;

storing a torque fluctuation limit line based on the relevant information;

calculating a distance between a current operating point of the internal combustion engine and a point on the torque fluctuation limit line, on an xy plane having the ignitionability index value as an x-coordinate value and having the combustion timing index value as a y-coordinate value, the current operating point being specified by the ignitionability index value and the combustion timing index value;

executing a first control in which the ignition device is controlled such that ignition timing is retarded, when the distance is larger than a threshold value; and executing a second control in which the fuel injection valve is controlled such that an air-fuel ratio is enriched and the ignition device is controlled such that the ignition timing is retarded, when the distance is equal to or smaller than the threshold value.

* * * * *